Figure 1:
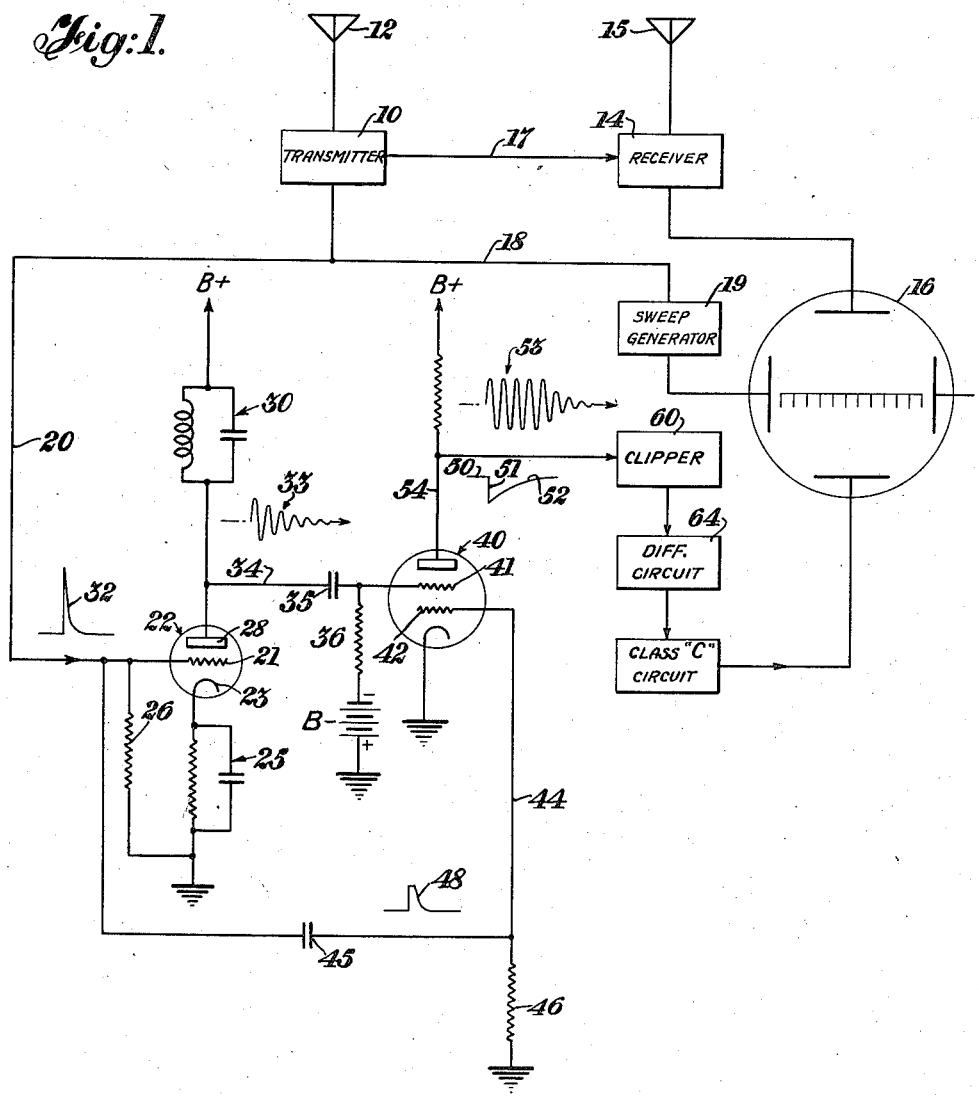

April 6, 1948.  L. A. DE ROSA  2,438,904
TIMING SYSTEM
Filed Nov. 23, 1942  3 Sheets-Sheet 1

INVENTOR.
LOUIS A. DE ROSA
BY Percy P. Lantzy
ATTORNEY

Patented Apr. 6, 1948

2,438,904

UNITED STATES PATENT OFFICE 2,438,904

TIMING SYSTEM

Louis A. de Rosa, Staten Island, N. Y., assignor to Federal Telephone and Radio Corporation, Newark, N. J., a corporation of Delaware Application November 23, 1942, Serial No. 466,557

13 Claims. (Cl. 250—27)

This invention relates to radio detection systems and more particularly to a method and means for calibrating the screen of the indicating oscillograph or oscillographs of the system.

Radio detection systems to which this invention relates are of the character which transmits a high voltage impulse and then detects echoes thereof caused by the presence of obstacles within the range of the system. By means of directive antenna equipment and suitable timing means, the azimuth and elevation of and the distance to any particular obstacle causing an echo can be determined. Such systems are particularly useful in detecting and determining locations of enemy aircraft and ships. Systems of this character are disclosed in copending applications of H. Busignies, Serial No. 381,640, filed March 4, 1941, entitled "Position finding system for gun fire control" and Serial No. 458,191, filed September 14, 1942, now Patent Number 2,423,304, entitled "Pulse generating system."

It has been proposed heretofore to use the transmitted impulses, especially where their occurrence is at an unsteady frequency, to shock excite an L—C circuit and to use the resulting damped waves or pulse markers generated thereby to calibrate the screen of the oscillograph. However, marks produced by a damped wave are not always satisfactory because the amplitude of the oscillations of the wave decreases too rapidly. The solution to this difficulty would appear to be the provision of a high "Q" circuit. But a circuit having a sufficiently high "Q" for good calibrating purposes is difficult to obtain in actual practice.

One of the objects of this invention, therefore, is to provide a method and means to produce in response to an electrical impulse a given wave train and/or a series of pulse markers of substantially constant amplitude.

Another object of this invention is to provide a method and means for varying the bias of a vacuum tube so as to effect a desired variation in the gain thereof over a given interval of time.

The method of this invention is concerned primarily with the problem of compensating for the decay of a damped wave train such as may be produced by shock exciting an L—C circuit by means of an impulse such as transmitted for obstacle detection purposes. This I accomplish by applying the damped wave energy to a circuit of a vacuum tube and varying gradually the bias of the tube so as to effect a gradual increase in the gain thereof just sufficiently to offset the damping of the oscillations of the wave. These steps in combination with other steps of the method as will hereafter be made clear, produce a wave train or a series of pulse markers of constant amplitude, whichever may be required.

Figure 2:
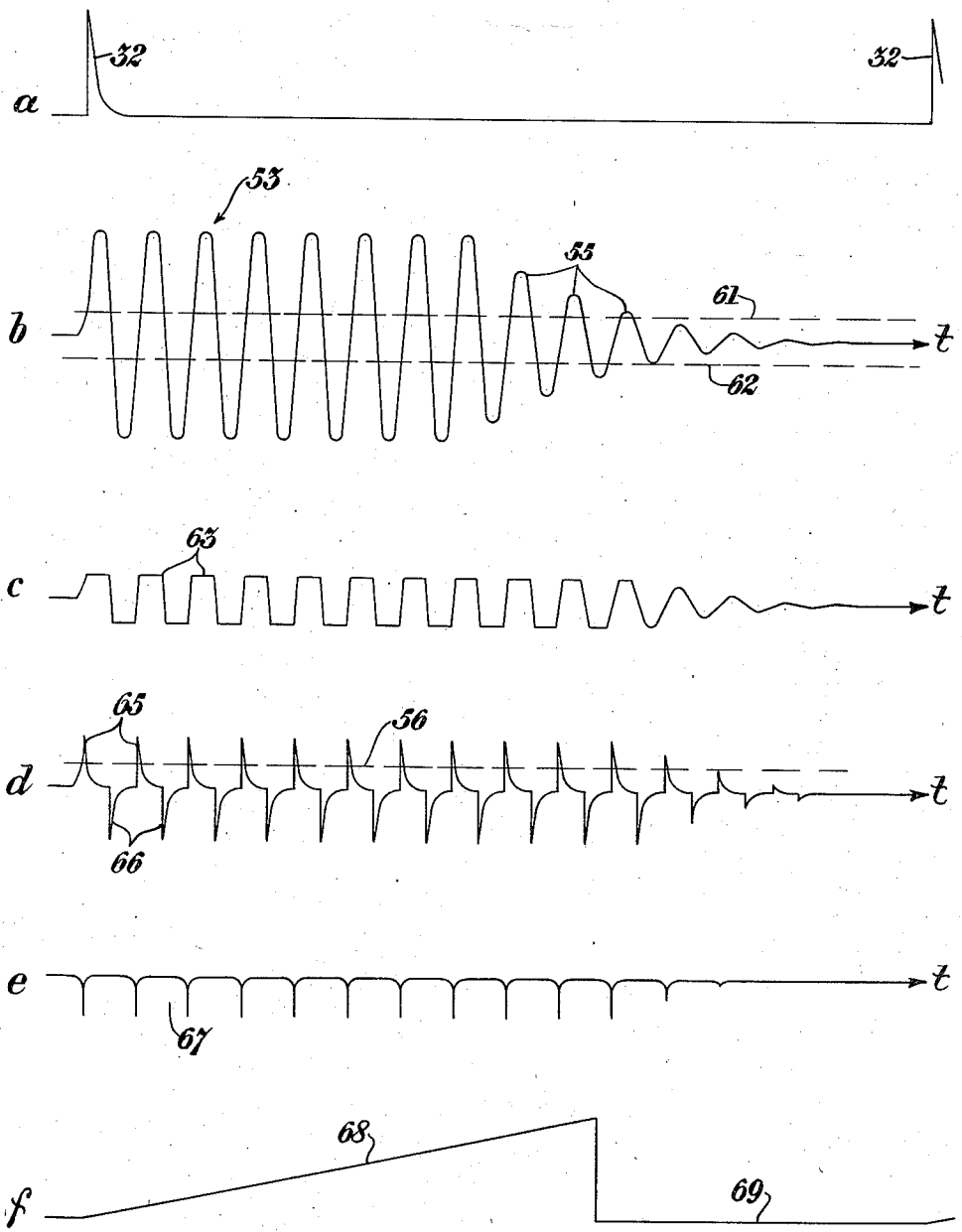
Figure 3:
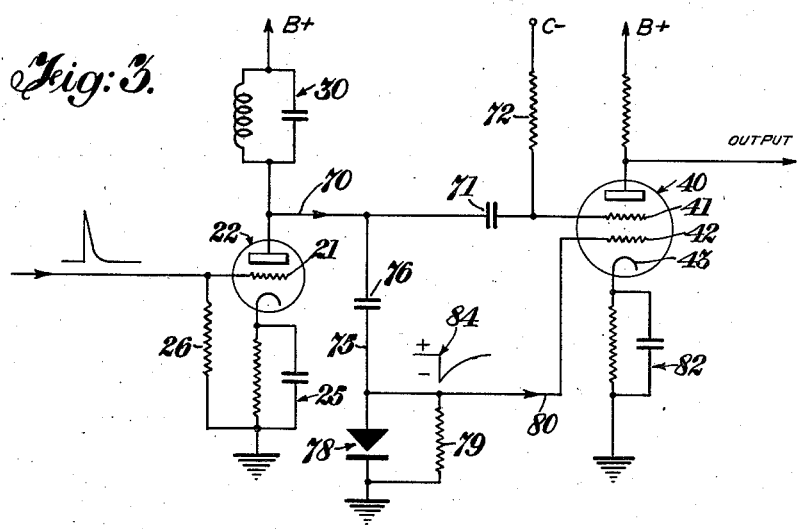
Figure 4:
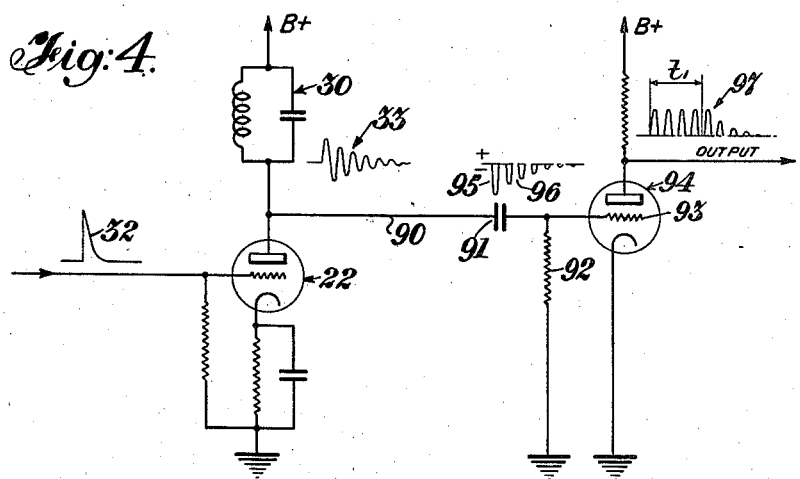

For a better understanding of the method, reference may be had to the following detailed description of several forms of apparatus by which the method may be practiced, the detailed description to be read in connection with the accompanying drawings, in which, Fig. 1 is a schematic illustration of a radio detection system incorporating apparatus made in accordance with this invention;

Fig. 2 is a graphical illustration of the constant amplitude wave train produced and how the wave train is modified to produce pulse markers; and Figs. 3 and 4 are schematic illustrations of two additional forms of apparatus in accordance with this invention.

Referring to Fig. 1 of the drawings, a radio detecting system is schematically shown incorporating one of the embodiments of this invention. The system includes a known type of transmitter 10 and an antenna 12 for transmission of recurring impulses. A receiver 14 and antenna 15 together with an oscillograph 16 are provided to receive and indicate echo pulses caused by obstacles such as aircraft or ships in response to the transmitted impulses. Connecting the transmitter to the receiver is the usual blocking circuit 17 arranged to block the receiver during the transmission of impulses. The sweep circuit of the oscillograph 16 is controlled by the impulse energy of the transmitter 10 through a connection 18 to a sweep generator 19. The interval of time represented by the location of an echo pulse on the screen of the oscillograph with respect to a reference point such as the left-hand end of the trace line is used to determine the time interval between the transmission of an impulse and an echo thereof. This interval is used to determine the distance to the obstacle causing the echo.

A calibrated scale or series of pulse markers for the screen of the oscillograph whereby the distance represented by the location of the echo pulse can be readily determined is provided. In accordance with my invention, the generation of the pulse markers is controlled by energy of the transmitted impulse. This energy is applied over a connection 20 to the grid 21 of a vacuum tube 22 which has a cathode 23 self-biased by a resistance-capacitance circuit 25 and a grid 21 connected by a grid leak 26 to the ground connection of the circuit 25. The plate 28 of the tube 22 is connected to a tuned inductance-capacitance circuit 30. When an impulse 32 is applied to the grid 21, the wave front thereof is adapted to shock excite the tuned circuit 30 and thereby produce a damped wave train 33. The energy of the wave train 33 is applied over a connection 34 to a time constant circuit including a condenser 35 and a resistance 36 connected to the grid 41 of a vacuum tube 40. The resistance 36 is connected to the negative side of battery B to provide a negative bias on the tube 40.

In order to compensate for the decay of the oscillations of the damped wave train 33, a second grid electrode 42 is connected to a time constant circuit 44 which includes a condenser 45 and a resistance 46 one end of which is connected to ground as shown in Fig. 1. The circuit 44 is connected to the connection 20 from the transmitter 10. Energy of the pulse 32 is simultaneously applied to the circuit 44 when it is applied to the grid 21 and this energy on passing through the time constant circuit 44 assumes a shape substantially as shown at 48. In other words, the pulse energy 32 charges the condenser 45 negatively due to the grid current flowing in the circuit 44 thereby resulting in a pulse 48 of less amplitude than the pulse 32. The discharge of the condenser through the resistance 46 produces an extended trailing edge for the pulse 48. This trailing edge follows an exponential curve similar to the decay of the wave 33.

The energy of the pulse 48 is applied to the grid 42 thereby producing a sharp initial drop 51 from the maximum gain 50 of the tube 40 (see characteristic curve adjacent plate circuit 54). Due to the value of the resistance 46 the gain of the tube gradually increases back to maximum value along an exponential curve 52. This increase in gain is so chosen by the values of the resistance 46 and the condenser 45 that the decay of the wave train 33 as it is applied through the time constant of the condenser 35 and resistance 36 to the tube 40 is compensated for thereby giving an output wave 53 in the plate or anode circuit 54, the oscillations of which are of substantially constant amplitude for an interval of time during which the gain 52 increases back to maximum. After the gain has returned to maximum value, the output wave 53 is damped off rapidly as indicated at 55 (Fig. 2).

This resulting plate output wave 53 and its relation with respect to recurring impulses 32 are shown in parts a and b of Fig. 2. The oscillations of this wave may be applied to an oscillograph for calibration purposes or the wave can be passed through additional means by which narrow marker pulses are generated. As indicated in Fig. 1 and parts b, c, d, and e of Fig. 2, the wave 53 is first clipped by passing it through a clipper 60 such as a properly biased tube whereby the oscillations of the wave are clipped as indicated by the lines 61 and 62. This results in a wave of substantially rectangular pulses 63 and this wave is passed through a differentiating circuit 64 to produce alternately positive and negative narrow shaped pulses 65 and 66. This pulse energy is passed through a class "C" amplifier to produce uni-directional pulses 67, the amplifier being biased to cut off at the threshold line 56.

These pulses 67 are of substantially equal amplitude for the desired length of the trace line so that when applied to the oscillograph 16 they divide the length of the trace line into equal segments which can be easily counted to determine the location of an echo pulse appearing along the trace line. The sweep generator 19 is preferably adjusted to build up to a given sweep potential and then return to zero for each impulse 32 applied thereto. Such a sweep potential is indicated at f (Fig. 2). In this way the pulse markers 67 occurring during the sweep portion 68 appear on the oscillograph while those pulses which occur during the inactive portion 69 of the sweep cycle do not appear or if they do they will underlie the initial pulse occurring at the initiation of the next cycle.

In Fig. 3 of the drawing, I have shown a modified form of the apparatus shown in Fig. 1 by which I produce substantially the same results. I employ here the same tube 22 and tuned circuit 30. The grid 21 has connected thereto the grid leak 26 and the cathode 23 is self-biased by the circuit 25. The plate circuit 70 is connected to a time constant circuit including a condenser 71 and a resistance 72 which are connected to the grid 41 of the tube 40 similarly as in Fig. 1. The means for compensating for the decay of the wave train 33 (Figs. 1 and 4) produced by shock excitation of the circuit 30 include a circuit 75 connected through a condenser 76 to the plate circuit 70. This circuit 75 contains a known type of rectifier 78 across which is connected a resistance 79 and the output thereof is connected by a line 80 to the second grid 42 of the tube 40. The cathode 43 of the tube 40 is self-biased by a resistance-condenser circuit 82 so that it will not draw current until the grid potentials are positive. The rectified current as indicated at 84 comprises negative direct current which commences at a high negative value corresponding to the amplitude of the initial oscillation of the wave train 33 and decreases exponentially to zero value. This negative direct current is applied to the grid 42 and thereby decreases gradually the negative bias of the tube. This decrease of the negative bias alters the gain of tube so as to substantially offset the decay of the wave train 33 until the direct current returns to zero value. The output of the tube 40 will be of the general wave shape shown in part b of Fig. 2.

In Fig. 4 another embodiment is disclosed wherein the tube 22, the circuit 30 disclosed in Figs. 1 and 3 are employed, the plate circuit 90 of which is connected through a time constant circuit including a condenser 91 and a resistance 92 applied to the grid 93 of a triode 94. The damped wave train 33 charges the condenser 91 negatively as indicated at 95 by the first positive peak thereof. The following oscillations of the wave train 33 provide successively decreasing pulse charges for the condenser 91, and the smoothing out function of the high resistance 92 provides a gradually decreasing bias as indicated by the curve 96 thereby giving an exponential variation to the gain of the tube 94.

If the amplitude of the pulse 32 is large so that the negative peaks can drive the tube 94 to plate current cutoff, this will effect a clipping action insuring constant amplitude for a series of pulses such as shown for the interval $t_1$ at 97. These markers may be applied directly to the oscillograph for calibration purposes or they can be passed through a known pulse shaper to narrow them before application to an oscillograph, or they may be applied to a system of clipping, differentiating and threshold clipping as hereinbefore described in connection with Fig. 1.

Although I have described the system with my invention in connection with an obstacle detection system, it is clear that the principles set forth are not so limited in scope. The method and system is applicable wherever it is desired to produce a substantially constant amplitude wave train or a series of constant amplitude pulses of limited duration in response to a single applied pulse.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

What I claim is:

1. A method of producing a short wave train having a series of oscillations of substantially constant amplitude comprising generating a damped wave train having a decay characteristic which determines the duration thereof, and compensating for the decay of the damped wave train for a plurality of the oscillations thereof by adding to the damped wave train a wave of energy increasing in amplitude at a rate substantially proportional to the decay of said damped wave.

2. A method of producing in the output of a tube circuit a short wave train having a series of oscillations of substantially constant amplitude comprising amplifying a damped wave train at a rate substantially proportionate to the decay thereof.

3. A method of producing calibrated markers of substantially constant amplitude for the screen of an oscillograph of a radio detection system adapted to transmit impulses and receive echoes thereof, which method comprises initiating generation of a damped wave train having a given decay characteristic which determines the duration thereof in synchronism with the transmission of an impulse, compensating for the decay of the damped wave train for a plurality of oscillations thereof, and deriving a series of uni-directional pulse markers therefrom.

4. A method of producing uni-directional sharply pointed pulses of substantially constant amplitude comprising generating a damped wave train having a given decay characteristic which determines the duration thereof, compensating for the decay of the damped wave train for a plurality of oscillations thereof, and deriving therefrom a series of uni-directional pulses.

5. A system for producing a short wave train having a series of oscillations of substantially constant amplitude comprising means to generate a damped wave train having a given decay characteristic which determines the duration thereof, means to produce a wave of energy increasing in amplitude at a rate substantially proportional to the rate of decay of said damped wave, and means to apply said energy wave to said damped wave train to compensate for the decay of the damped wave train for a plurality of the oscillations thereof.

6. A system for producing a wave train having a series of oscillations of substantially constant amplitude comprising a tube including grid and anode electrodes, means to generate a damped wave train, means to apply energy of the damped wave train to a grid electrode of said tube, and means to effect a gradual increase in the gain of the tube to offset the decay of the oscillations of the damped wave train, thereby producing a plurality of energy oscillations of substantially constant amplitude in the anode electrode of the tube.

7. The system defined in claim 6 wherein the means to effect a gradual increase in the gain of the tube comprises a grid circuit having a condenser and a resistance of values selected to provide a time constant such that the gain in the tube is increased in accordance with the decay in the oscillations of the damped wave train.

8. The system defined in claim 6 wherein the means to effect a gradual increase in the gain of the tube comprises means to rectify a part of the energy of the damped wave train and means to apply the rectified current to a grid electrode of the tube.

9. A system for producing a short wave train having a series of oscillations of substantially constant amplitude comprising a tube including grid and anode electrodes, a tuned circuit, means to apply discrete electrical impulse to said circuit to initiate oscillations for a short period therein, means to apply energy of the oscillations to a grid electrode of the tube, and means to effect a gradual increase in the gain of the tube to offset the decay of the oscillations produced in said tuned circuit, thereby producing a plurality of energy oscillations of substantially constant amplitude in the anode circuit of the tube.

10. The system defined in claim 9 wherein the means to effect a gradual increase in the gain of the tube comprises means to reshape energy of the electrical impulse in accordance to an exponential time constant and means to apply the reshaped impulse energy to a grid electrode of the tube.

11. A system for producing calibrated pulse markers of substantially constant amplitude for the screen of an oscillograph of a radio detection system adapted to transmit electrical impulses and receive echoes thereof, comprising means responsive to said electrical impulses to generate for each impulse a damped wave train, means to compensate the decay of the damped wave for a plurality of the oscillations thereof, means to clip the resulting oscillations to produce a wave of substantially rectangular pulses, means to differentiate the wave thus produced to form alternately positive and negative sharply pointed pulses, and means to segregate therefrom the pulses disposed in one direction.

12. A system for producing uni-directional sharply pointed pulses of substantially constant amplitude comprising a damped wave source, means to compensate the decay of the damped wave for a plurality of the oscillations thereof, means to clip the resulting oscillations to produce a wave of substantially rectangular pulses, means to differentiate the wave thus produced to form alternately positive and negative sharply pointed pulses, and means to segregate therefrom the pulses disposed in one direction.

13. A method of producing a short wave train having a series of oscillations of substantially constant amplitude comprising producing a wave having a decay characteristic which determines the duration thereof, and compensating the decrease of energy of said wave at a rate substantially proportionate to the progressive decay thereof.

LOUIS A. DE ROSA.

REFERENCES CITED

The following references are of record in the file of this patent:

UNITED STATES PATENTS

| Number | Name | Date |
|---|---|---|
| 2,423,304 | Fitch | July 1, 1947 |
| 2,419,590 | Preisman | Apr. 29, 1947 |
| 2,422,204 | Meacham | June 17, 1947 |
| 2,422,205 | Meacham | June 17, 1947 |
| 2,103,090 | Plebanski | Dec. 21, 1937 |
| 2,138,138 | Bruckner | Nov. 29, 1938 |
| 1,908,249 | Hund | May 9, 1933 |
| 2,264,369 | Golicke | Dec. 2, 1941 |
| 2,167,492 | Sprouls | July 25, 1939 |
| 2,009,459 | Turner, Jr. | July 30, 1935 |

OTHER REFERENCES

Proceedings of the I. R. E., vol. 28, No. 9, Sept. 1940, pp. 406–409, "The Generation for Television of Horizontal Synchronizing Pluses, Etc." by J. S. Sherman.